US012733072B2

(12) United States Patent
Ross et al.

(10) Patent No.: US 12,733,072 B2
(45) Date of Patent: Sep. 8, 2026

(54) SOFTWARE FILTER FOR NOISE REDUCTION IN LIGHTING CONTROLLER

(71) Applicant: UnitX, Inc., Santa Clara, CA (US)

(72) Inventors: Gilbert Dale Ross, San Mateo, CA (US); Ketan Lakhera, San Jose, CA (US); Yen-Chia Chu, San Jose, CA (US); Jaideep Singh Chavan, Mountain View, CA (US)

(73) Assignee: UnitX, Inc., Santa Clara, CA (US)

( * ) Notice: Subject to any disclaimer, the term of this patent is extended or adjusted under 35 U.S.C. 154(b) by 0 days.

(21) Appl. No.: 18/913,210

(22) Filed: Oct. 11, 2024

(65) Prior Publication Data

US 2026/0107358 A1 Apr. 16, 2026

(51) Int. Cl.

*H05B 45/36* (2020.01)
*G01N 21/17* (2006.01)
*H04N 23/81* (2023.01)
*H05B 45/32* (2020.01)
*H05B 47/14* (2020.01)

(52) U.S. Cl.

CPC ............. *H05B 45/36* (2020.01); *G01N 21/17* (2013.01); *H04N 23/81* (2023.01); *H05B 45/32* (2020.01); *H05B 47/14* (2020.01); *G01N 2021/177* (2013.01); *G01N 2201/0694* (2013.01); *G01N 2201/0698* (2013.01)

(58) Field of Classification Search

CPC ........ H05B 45/36; H05B 45/32; H05B 47/14; G01N 21/17; G01N 2021/177; G01N 2201/0694; G01N 2201/0698; H04N 23/81

See application file for complete search history.

(56) References Cited

U.S. PATENT DOCUMENTS

| | | | | |
|---|---|---|---|---|
| 5,563,532 | A * | 10/1996 | Wu | H03K 5/1252 327/551 |
| 6,072,338 | A * | 6/2000 | Nishiuchi | G01R 29/02 377/52 |
| 2021/0320647 | A1* | 10/2021 | Mertens | H03K 19/20 |
| 2023/0107061 | A1* | 4/2023 | Greenhut | A61N 1/3702 607/17 |
| 2024/0060905 | A1* | 2/2024 | Lenser | G01N 21/8851 |

* cited by examiner

*Primary Examiner* — Michael Lee

(74) *Attorney, Agent, or Firm* — Schwegman Lundberg & Woessner, P.A.

(57) ABSTRACT

In an example embodiment, an improved lighting controller designed to reduce the effects of electromagnetic interference is introduced. The improved lighting controller contains software that acts to filter input lines so that noise is ignored while legitimate pulses coming from sensors are handled. The software filter works by comparing pulse widths of pulses on input lines to an expected pulse width.

17 Claims, 4 Drawing Sheets

SOFTWARE FILTER FOR NOISE REDUCTION IN LIGHTING CONTROLLER

TECHNICAL FIELD

This application relates generally to inspection camera assemblies. More particularly, this application relates to a lighting controller with noise and signal isolation for use in an inspection camera assembly.

BACKGROUND

Inspection cameras are used in industrial products to aid in detecting defects in manufactured products. For example, if a manufacturer is producing metal castings, one or more inspection cameras may be placed in a manufacturing and/or assembly line to inspect the produced metal castings, or portions thereof, to detect any issues with quality control. An inspection camera assembly may include a camera mounted to or near multiple independently controlled light sources. These light sources may be activated in a coordinated sequence that is controlled by a lighting controller, to light the manufactured product from different angles and different times.

DETAILED DESCRIPTION

Figure 1:
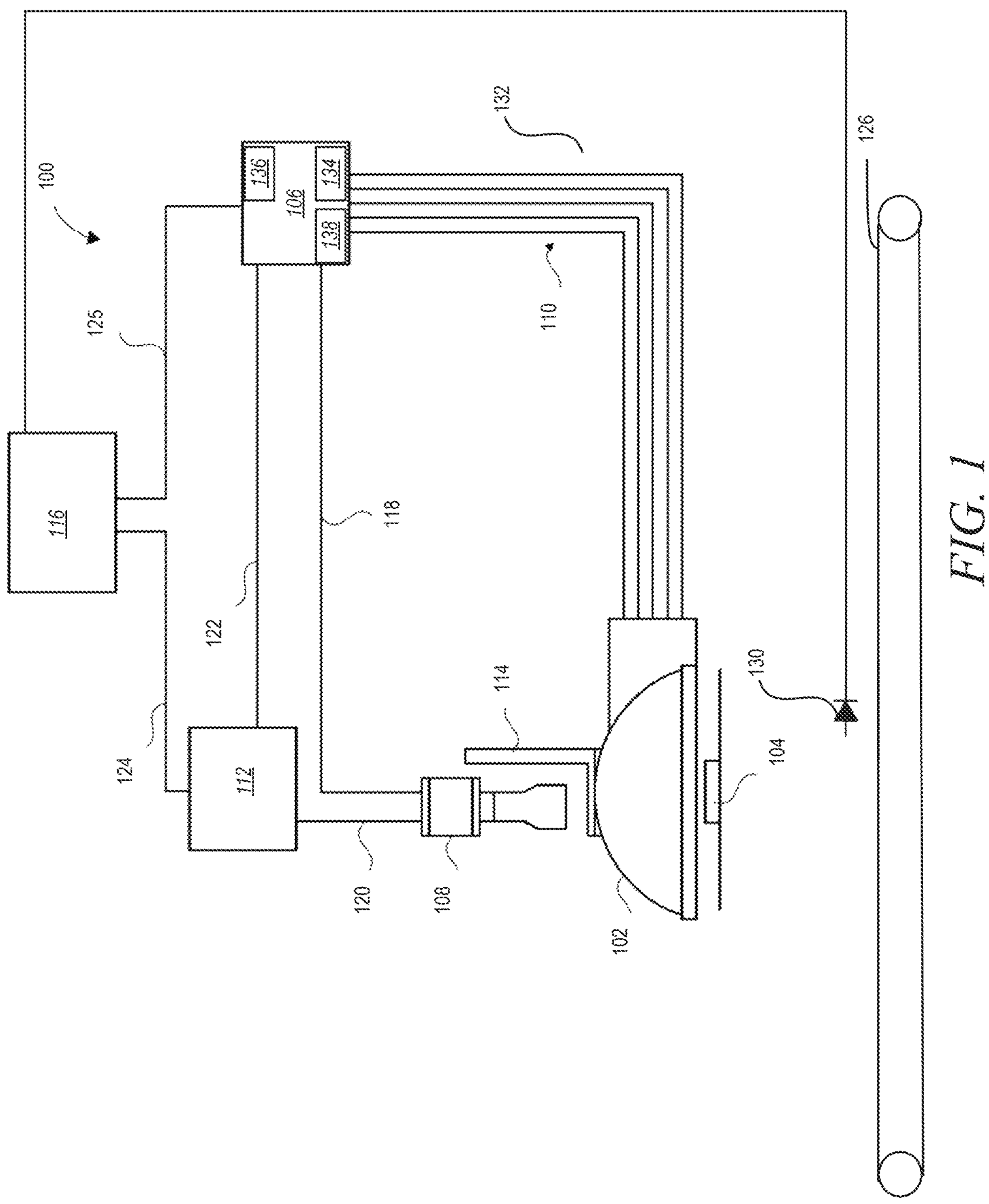
FIG. 1 illustrates a block diagram of an inspection system according to some examples.

Fly capture in inspection contexts, particularly in industrial or quality control settings, refers to a technique used to detect and measure defects, flaws, or issues on a surface of an object without the object coming to a halt in front of the camera. In other words, the object can be moving, such as on a conveyor belt, when the inspection is performed.

Fly capture can help in identifying surface defects such as scratches, dents, or unevenness that might not be easily visible through standard inspection methods. It provides a high-resolution analysis of the surface.

The technique is useful in environments where high-speed inspection is required. It can quickly capture and analyze data from fast-moving objects or processes, making it suitable for automated inspection systems.

Fly capture often uses advanced imaging or scanning technology to provide precise measurements and detailed images of surfaces. This high level of detail helps in identifying small or subtle defects that could affect the quality or performance of a product.

An issue that can arise in lighting controllers in systems that perform fly capture is that noise may be introduced into one or more input lines to a lighting controller. More specifically, sensors may be used throughout the inspection camera system so that, for example, the system is made aware when a part running on a conveyor belt passes a particular spot. There may be many of these sensors in the inspection camera system, each with its own input line to the lighting controller. A pulse is generated on such an input line when the corresponding sensor senses a part at a corresponding location.

When this pulse is detected at the controller, and specifically by software (e.g., firmware) on the controller, the software knows to trigger a camera to take an image of the part. Noise, however, can be introduced on one or more of these input lines. For example, if the wire between the sensor and the controller runs by an electric motor, the electromagnetic field caused by the electric motor can cause noise on the wire. This noise can be confused for a pulse coming from the sensor, causing the controller to inadvertently trigger the camera to capture an image even when the sensor did not actually detect anything or generate the pulse.

In an example embodiment, an improved lighting controller designed to reduce the effects of electromagnetic interference is introduced. The improved lighting controller contains software that acts to filter input lines so that noise is ignored while legitimate pulses coming from sensors are handled.

It should be noted that while in the present disclosure a legitimate pulse on an input line is described as being generated by a sensor, in some example embodiments this may include a pulse generated by an intermediate component. For example, the sensor may generate one pulse when a part is detected at a particular location, but an intermediate component may receive this pulse and generate a separate pulse to the controller informing it of the positive sensor reading. In that sense, the pulse being detected on the input line may not come directly from the sensor. However, the claims shall be interpreted broadly to cover such an intermediate generation of pulse, unless expressly disavowed.

In an example embodiment, a software filter in the controller looks at each input line and detects when a pulse is present on the line. The pulse width of each detected pulse is measured and then compared to an expected pulse width. If the actual pulse width of the detected pulse is greater than the expected pulse width or within some threshold percentage below the expected pulse width, the software filter considers the pulse to be a valid pulse and allows it through to the rest of the controller/software for processing as a positive signal from a sensor. If the actual pulse width of the detected pulse, however, is less than the threshold percentage below the expected pulse width, then the pulse is ignored and treated as noise rather than a valid pulse.

The software filter may check the input lines at a high rate of frequency, such as every 50 microseconds. The expected pulse width would typically be expected to be several orders of magnitude greater than that period between checks, such as at least a pulse width of 250 microseconds but more commonly 1 millisecond or greater. This allows the checking frequency to be frequent enough to detect pulse widths that are less than the threshold percentage below the expected pulse width.

The result is that noise on input lines to the controller can be filtered using such a software filter, improving performance of the lighting controller in an inspection camera system and thus improving the reliability of predictions made by the inspection camera by reducing the number of images captured based on a false positive pulse from a sensor from noise in an input line.

FIG. 1 illustrates a block diagram of an inspection system 100 according to some examples. The inspection system 100 includes a light dome 102, a camera 108, a controller 106, an industrial computer 112, and a factory computer 116. The factory computer 116 is in communication with controller 106 and the computer 112 via a wired or wireless factory network 124.

The light dome 102 in use illuminates a target object 104, such as a metal casting or other product. The light dome 102 includes a housing containing a number of light sources as will be described in more detail below. In some examples, the light sources comprise a plurality of LEDs or display screens arranged to provide flexibility in illuminating the target object 104. The light sources are selectively activated by the controller 106 using power cables 110. A light source is a unit of lighting that is individually addressable by the controller 106 to illuminate the target object 104. An individual light source may thus comprise a single LED or a number of LEDs that are addressable as a group. A light source may also comprise a subset of a light generating unit, such as a group or block of pixels in a flexible display screen. Preferably the light dome 102 includes at least ten individually addressable light sources arranged within the light dome 102, to provide lighting flexibility.

The camera 108, which may be mounted to the light dome 102 by a bracket 114, captures images of the illuminated target object 104 through a hole in the top of the light dome 102. The camera 108 is triggered by the controller 106 via a trigger line 118, synchronized to the actuation of the light sources in light dome 102.

The controller 106 controls operation of the camera 108 and illumination of the target object 104 by the light dome 102. The controller 106 receives instructions from the computer 112 via a control line 122. The controller 106 may be implemented by a hardware processor disposed in the camera 108. The controller 106 may further include hardware components that may include a combination of Central Processing Units ("CPUs"), buses, volatile and non-volatile memory devices, storage units, non-transitory computer-readable media, data processors, processing devices, control devices transmitters, receivers, antennas, transceivers, input devices, output devices, network interface devices, and other types of components that are apparent to those skilled in the art. These hardware components within the user device may be used to execute the various applications, methods, or algorithms disclosed herein independent of other devices disclosed herein.

The controller 106 illuminates the target object according to one or more optimal lighting configurations. The lighting configurations may be defined as a matrix, where each value of the lighting configuration matrix represents a working status of each independently controllable light source, such as one or more LEDs and/or groups of pixels on a flexible display screen. The matrix may also include brightness or color values for particular configurations. The lighting configurations may also be arranged into a configuration sequence, which specifies an order of lighting configurations to be executed for a particular target object 104, such that a number of images under different lighting conditions are captured by the camera 108.

The computer 112 runs software that provides a user interface that can be used to specify lighting configurations and sequences, which can be loaded into the controller 106. The computer 112 also instructs operation of the controller 106 via the control line 122, and receives images captured by the camera 108 via a data line 120.

The factory computer 116 provides overall factory control and can receive operational data and captured images from the controller 106 and the computer 112 via the factory network 124. The factory computer 116 can also provide instructions to control or initiate operation of the inspection system 100, based for example on other factory operations such as the movement of target objects 104 past the light dome 102.

An object may be placed on a conveyor belt 126 and the conveyor belt 126 may move, causing the object to move so that it is at least somewhat under the camera 108 while one or more light sources on the light dome 120 are illuminated. As mentioned before, this may be performed under fly capture conditions, where the conveyor belt 126 does not stop and thus where the object does not stop under the camera 108. Instead, multiple images of the object are captured from different angles and under different light conditions, but instead of the camera 108 moving around the object to capture these different angles the object moves while the camera 108 stays fixed.

As mentioned earlier, one or more input lines from one or more sensors used to monitor parts as they move on the conveyor belt 126 may be connected to the controller 106. Here, a single sensor 130 is depicted and a single input line 132 is depicted for simplicity, however embodiments are foreseen where there are any number of different sensors/input lines, and in fact fly capture techniques typically rely on multiple images taken from multiple angles of the same part as it moves on the conveyor belt 126 and thus in many embodiments there may be a plurality of sensors (e.g., ten sensors) placed proximate to different locations of the conveyor belt.

The controller 106 may include a software filter 134 that acts to filter pulses detected on the input lines 132. More particularly, the controller 106 maintains a memory 136, that is able to keep various settings relevant to the controller 106. Among these settings is a user-configurable expected pulse width and a threshold. A user is able to specify an expected pulse width based on their own usage of the inspection system 100, and more particularly based on the sensors, such as sensor 130, that are used in the inspection system 100, as well as environmental factors.

It may be desirable for the expected pulse width to be set at a minimum expected pulse width in scenarios where there may be a range of expected pulse widths on pulses from the sensors. This range may be due to many reasons. One reason would be if different types of sensors or different brands of sensors are utilized, as it would be expected that each type of sensor or each brand of sensor could have different standard pulse widths in their respective pulses. Another reason is simply due to the imprecise nature of signal generation. An electronic device such as a sensor cannot be expected to always have exactly the same pulse width for generated pulses. As such, to cover any of these scenarios, it is desirable for whatever the shortest expected pulse width is to be set as the expected pulse width. Thus, for example, if a user expects that the pulse widths from sensors in a system would be between 1 millisecond and 1.5 milliseconds, then the expected pulse width should be set to 1 millisecond, to ensure that valid pulse widths of 1 microsecond are recognized as valid and not incorrectly filtered out.

In some instances, it may be desirable to set the expected pulse width below the bottom of the range of expected pulse width values. This would potentially result in some instances where noise is not filtered out and an invalid pulse from noise is incorrectly interpreted as a valid sensor pulse, but there may be instances where this still may be part of a desirable configurations, such as where the effect of a false negative (a valid pulse being interpreted as invalid) is far worse than the effect of a false positive (an invalid pulse being interpreted as valid). Nevertheless, as can be seen, when a threshold is used the threshold can be used to account for this risk.

The threshold may be defined as a percentage. For example, the threshold may be set at 20%. This may indicate that a tolerance in filtering is utilized such that as long as the pulse width of a pulse is within 20% below the expected pulse width, then the pulse will be considered to be valid and not filtered out (the threshold has no applicability for pulses with pulse widths greater than the expected pulse width, as such pulses are considered valid no matter how much higher than the expected pulse width they are).

It should be noted that the threshold can be defined in other ways than a strict percentage. For example, an actual pulse width value can be specified that is to be subtracted from the expected pulse width. For example, rather than specifying the threshold as being 20% of the pulse width value it can be specified as being within 200 milliseconds of the expected pulse width value.

Thus, the software filter 134 monitors the input lines 132 and filters out any pulses that are not within the threshold percentage below the expected pulse width, as specified in the memory 136. Any unfiltered pulses are then sent to a capture control component 138. The capture control component 138 uses the pulse information to trigger the camera 108 to take an image, and this image can then be used via various image processing techniques along with other images of the same part to identify defects in the part.

Figure 2:
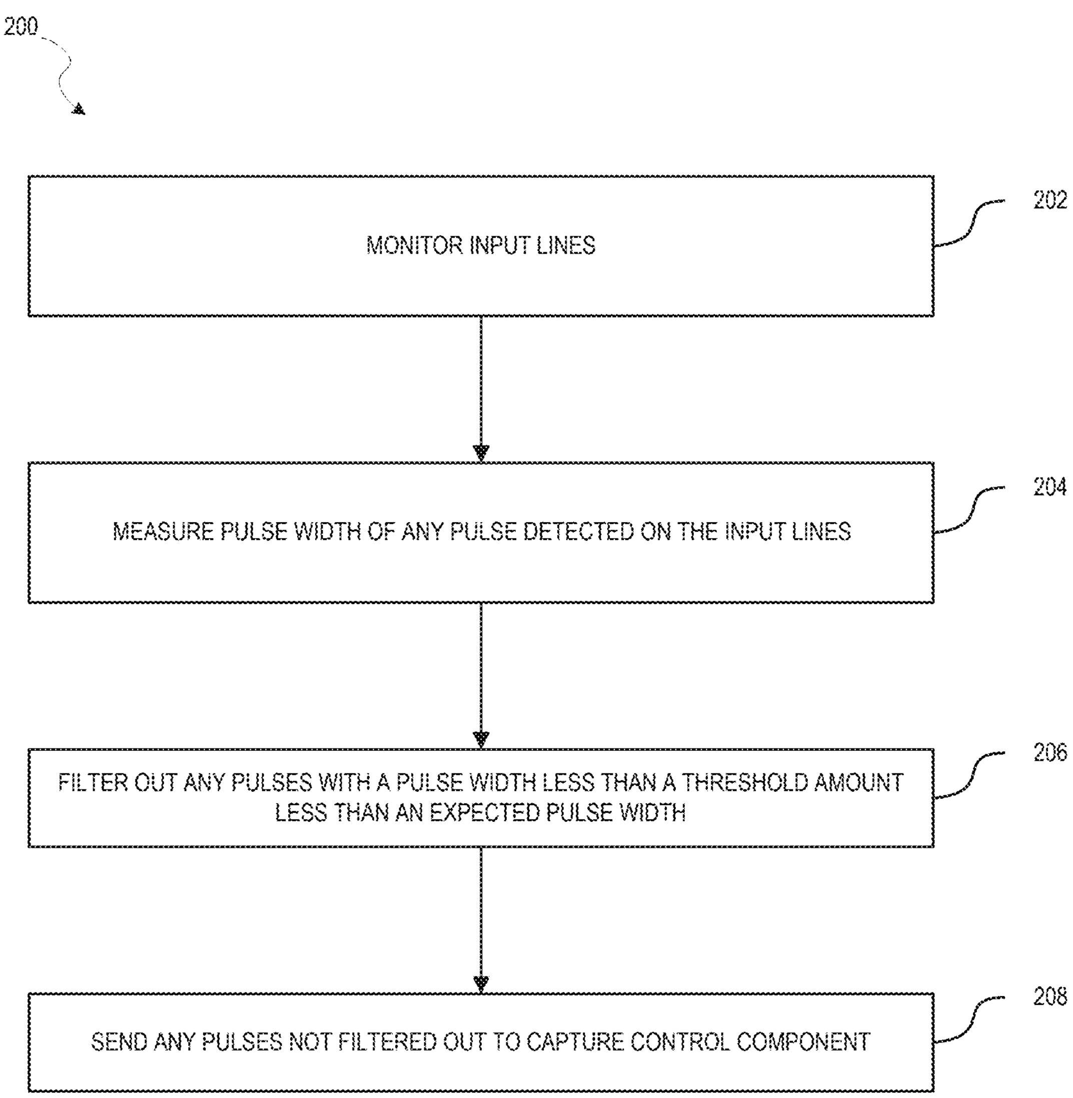
FIG. 2 is a flow diagram illustrating a method for operating a controller, in accordance with an example embodiment.

FIG. 2 is a flow diagram illustrating a method 200 for operating a controller, in accordance with an example embodiment. The operations in this method 200 may be performed, for example, by a software filter. At operation 202, the controller monitors input lines from one or more sensors. This may be accomplished by periodically checking (e.g., checking every time a period interval elapses) the input lines. The input lines are digital in nature, meaning that an electrical signal is either present or not present on the line. Any electrical signal on the line is considered to be part of a pulse, but it may not be clear whether that pulse is a valid one from a sensor or noise. Hence, at operation 204 a pulse width of any pulses detected on the input lines is measured. At operation 206, any pulses with a pulse width that is less than a threshold amount less than a specified expected pulse width are filtered out. Then at operation 208, any pulses not filtered out are sent to the capture control component. The capture control component is configured to generate a trigger to the camera to cause the camera to capture an image, based on receipt of one or more pulses from the software filter.

It should be noted that while operation 204 describes the detection of potentially multiple pulses on multiple input lines and operation 208 describes that these pulses (if not filtered out) are sent to the capture control component, this should not be interpreted as requiring that all of the pulses be measured (and compared, in accordance with operation 206), prior to any of them being sent to the capture control component. Operations 204-208 can be performed on one pulse at a time, such that a pulse width of a pulse detected on a first line is compared to the expected pulse width and the pulse sent to the capture control component if not filtered out before (or simultaneously as) the pulse width of a pulse is detected on a second line.

Figure 3:
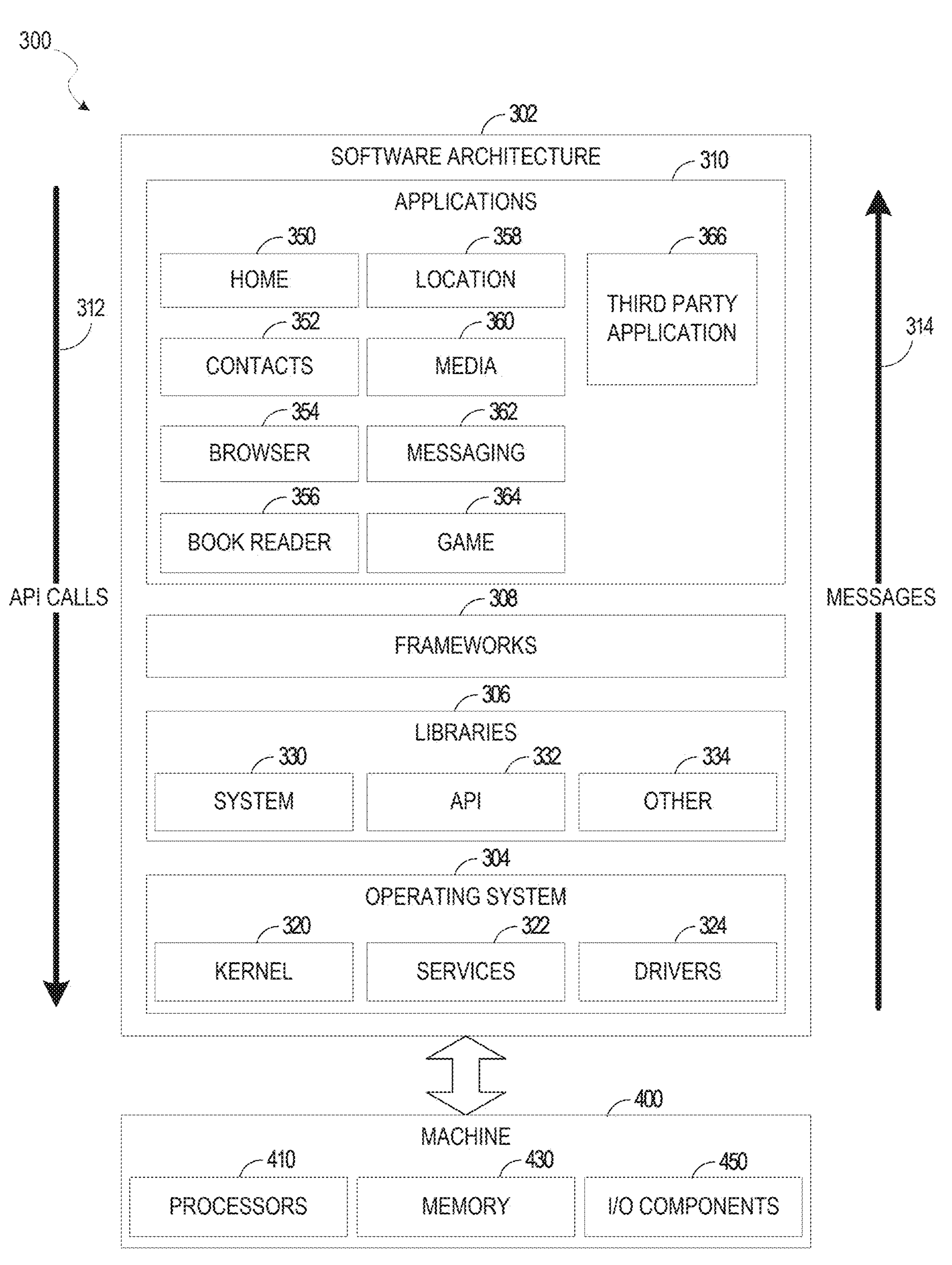
FIG. 3 is a block diagram illustrating a mobile device, according to an example embodiment.

FIG. 3 is a block diagram 300 illustrating a software architecture 302, which can be installed on any one or more of the devices described above. FIG. 3 is merely a non-limiting example of a software architecture, and it will be appreciated that many other architectures can be implemented to facilitate the functionality described herein. In various embodiments, the software architecture 302 is implemented by hardware such as a machine 400 of FIG. 4 that includes processors 410, memory 430, and input/output (I/O) components 450. In this example architecture, the software architecture 302 can be conceptualized as a stack of layers where each layer may provide a particular functionality. For example, the software architecture 302 includes layers such as an operating system 304, libraries 303, frameworks 308, and applications 310. Operationally, the applications 310 invoke Application Program Interface (API) calls 312 through the software stack and receive messages 314 in response to the API calls 312, consistent with some embodiments.

In various implementations, the operating system 304 manages hardware resources and provides common services. The operating system 304 includes, for example, a kernel 320, services 322, and drivers 324. The kernel 320 acts as an abstraction layer between the hardware and the other software layers, consistent with some embodiments. For example, the kernel 320 provides memory management, processor management (e.g., scheduling), component management, networking, and security settings, among other functionalities. The services 322 can provide other common services for the other software layers. The drivers 324 are responsible for controlling or interfacing with the underlying hardware. For instance, the drivers 324 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 306 provide a low-level common infrastructure utilized by the applications 310. The libraries 306 can include system libraries 330 (e.g., C standard library) that can provide functions such as memory allocation functions, string manipulation functions, mathematic functions, and the like. In addition, the libraries 306 can include API libraries 332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 306 can also include a wide variety of other libraries 334 to provide many other APIs to the applications 310.

The frameworks 308 provide a high-level common infrastructure that can be utilized by the applications 310. For example, the frameworks 308 provide various graphical user interface functions, high-level resource management, high-level location services, and so forth. The frameworks 308 can provide a broad spectrum of other APIs that can be utilized by the applications 310, some of which may be specific to a particular operating system 304 or platform.

In an example embodiment, the applications 310 include a home application 350, a contacts application 352, a browser application 354, a book reader application 356, a location application 358, a media application 360, a messaging application 362, a game application 364, and a broad assortment of other applications, such as a third-party application 366. The applications 310 are programs that execute functions defined in the programs. Various programming languages can be employed to create one or more of the applications 310, structured in a variety of manners, such as object-oriented programming languages (e.g., Objective-C, Java, or C++) or procedural programming languages (e.g., C or assembly language). In a specific example, the third-party application 366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system.

Figure 4:
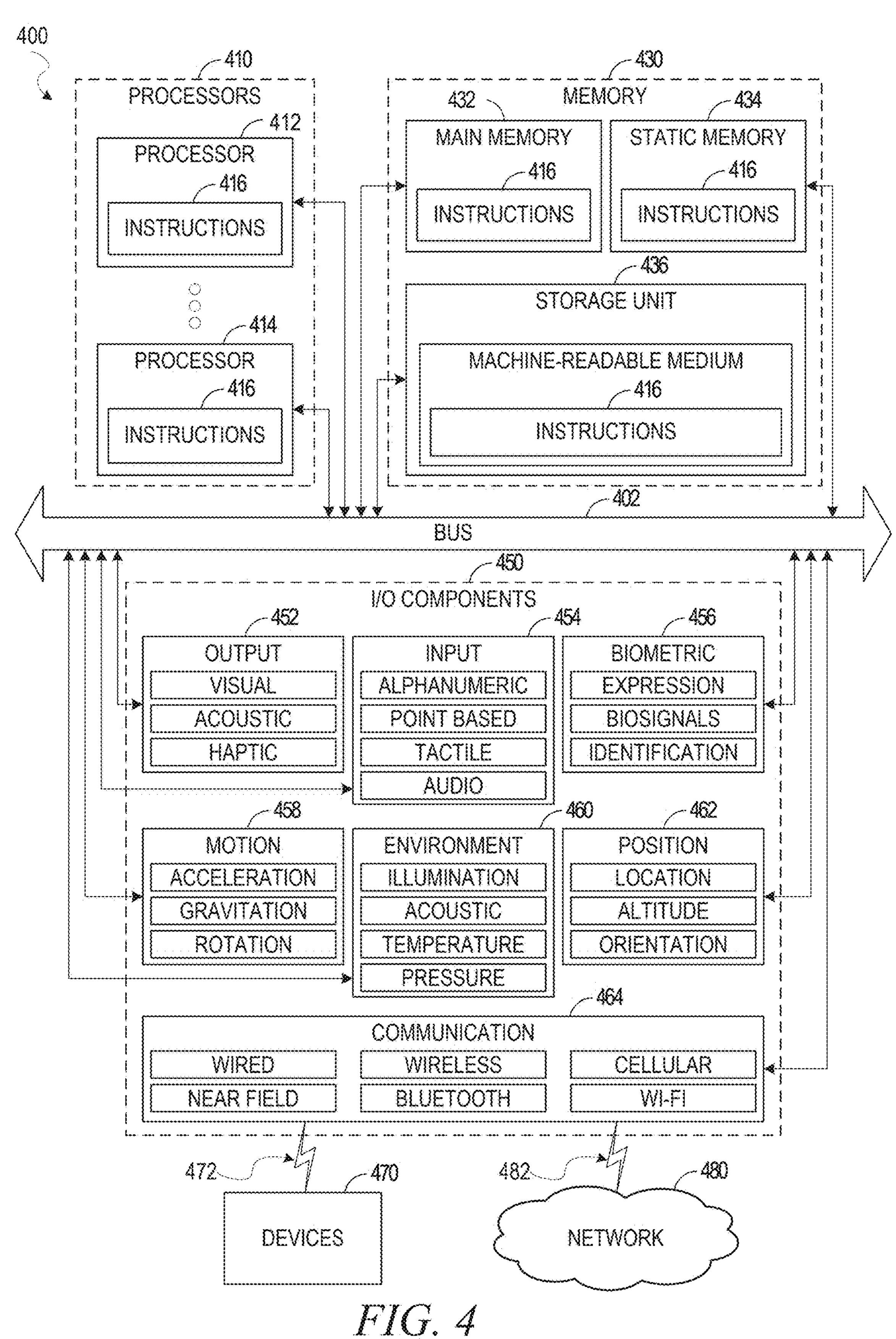
FIG. 4 is a block diagram of machine in the example form of a computer system within which instructions may be executed for causing the machine to perform any one or more of the methodologies discussed herein.

FIG. 4 illustrates a diagrammatic representation of a machine 400 in the form of a computer system within which a set of instructions may be executed for causing the machine 400 to perform any one or more of the methodologies discussed herein. Specifically, FIG. 4 shows a diagrammatic representation of the machine 400 in the example form of a computer system, within which instructions 416 (e.g., software, a program, an application, an applet, an app, or other executable code) cause the machine 400 to perform any one or more of the methodologies discussed herein to be executed. For example, the instructions 416 may cause the machine 400 to execute the method 200 of FIG. 2. Additionally, or alternatively, the instructions 416 may implement FIGS. 1-2 and so forth. The instructions 416 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 450, which may be configured to communicate with each other such as via a bus 402. In an example embodiment, the processors 410 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 412 and a processor 414 that may execute the instructions 416. The term "processor" is intended to include multi-core processors that may comprise two or more independent processors (sometimes referred to as "cores") that may execute instructions 416 contemporaneously. Although FIG. 4 shows multiple processors 410, the machine 400 may include a single processor 412 with a single core, a single processor 412 with multiple cores (e.g., a multi-core processor 412), multiple processors 412, 414 with a single core, multiple processors 412, 414 with multiple cores, or any combination thereof.

The memory 430 may include a main memory 432, a static memory 434, and a storage unit 436, each accessible to the processors 410 such as via the bus 402. The main memory 432, the static memory 434, and the storage unit 436 store the instructions 416 embodying any one or more of the methodologies or functions described herein. The instructions 416 may also reside, completely or partially, within the main memory 432, within the static memory 434, within the storage unit 436, within at least one of the processors 410 (e.g., within the processor's cache memory), or any suitable combination thereof, during execution thereof by the machine 400.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion, and the grouping is in no way limiting. In various example embodiments, the I/O components 450 may include output components 452 and input components 454. The output components 452 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 462 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or another suitable device to interface with the network 480. In further examples, the communication components 464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., coupled via a USB).

Moreover, the communication components 464 may detect identifiers or include components operable to detect identifiers. For example, the communication components 464 may include radio-frequency identification (RFID) tag reader components, NFC smart tag detection components, optical reader components (e.g., an optical sensor to detect one-dimensional bar codes such as Universal Product Code (UPC) bar codes, multi-dimensional bar codes such as QR code, Aztec codes, Data Matrix, Dataglyph, Maxi Code, PDF417, Ultra Code, UCC RSS-2D bar code, and other optical codes), or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

The various memories (i.e., 430, 432, 434, and/or memory of the processor(s) 410) and/or the storage unit 436 may store one or more sets of instructions 416 and data structures (e.g., software) embodying or utilized by any one or more of the methodologies or functions described herein. These instructions (e.g., the instructions 416), when executed by the processor(s) 410, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network, and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1RTT), Evolution-Data Optimized (EVDO) technology, General Packet Radio Service (GPRS) technology, Enhanced Data rates for GSM Evolution (EDGE) technology, third Generation Partnership Project (3GPP) including 8G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., Hypertext Transfer Protocol (HTTP)). Similarly, the instructions 416 may be transmitted or received using a transmission medium via the coupling 472 (e.g., a peer-to-peer coupling) to the devices 470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 416 for execution by the machine 400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A system comprising:

a lighting apparatus including a plurality of independently controllable light sources;

a camera;

one or more sensors; and a controller coupled to the camera, the lighting apparatus, and the one or more sensors, the controller comprising:

a capture control component; and a software filter configured to:

monitor input lines from the one or more sensors by periodically checking whether each input line has a signal, wherein each check is separated from a subsequent check by a period during which input lines are not checked, with a period having an interval that is less than a specified expected pulse width;

measure a pulse width of any pulses detected on the input lines;

filter out any pulses with a pulse width that is less than a threshold amount less than the specified expected pulse width;

cause the controller to send any pulses not filtered out to the capture control component; and wherein the capture control component is configured to generate a trigger to the camera to cause the camera to capture an image, based on receipt of one or more pulses from the software filter.

2. The system of claim 1, wherein the controller further comprises a memory storing the specified expected pulse width.

3. The system of claim 2, wherein the memory further stores the threshold amount.

4. The system of claim 1, wherein the threshold amount is expressed as a percentage of the specified expected pulse width.

5. The system of claim 1, wherein the controller is further configured to send one or more triggers to the lighting apparatus to control the plurality of independently controllable light sources.

6. The system of claim 5, wherein the one or more triggers sent to the lighting apparatus are sent as part of a sequence of triggers.

7. A method comprising, at a controller:

monitoring input lines from one or more sensors by periodically checking whether each input line has a signal, wherein each check is separated from a subsequent check by a period during which input lines are not checked, with a period having an interval that is less than a specified expected pulse width;

measuring a pulse width of any pulses detected on the input lines;

filtering out any pulses with a pulse width that is less than a threshold amount less than the specified expected pulse width; and sending any pulses not filtered out to a capture control component, wherein the capture control component is configured to trigger a camera to capture an image, based on the pulses not filtered out.

8. The method of claim 7, wherein the controller further comprises a memory storing the specified expected pulse width.

9. The method of claim 8, wherein the memory further stores the threshold amount.

10. The method of claim 7, wherein the threshold amount is expressed as a percentage of the specified expected pulse width.

11. The method of claim 7, wherein the controller is further configured to send one or more triggers to a lighting apparatus to control a plurality of independently controllable light sources.

12. The method of claim 11, wherein the one or more triggers sent to the lighting apparatus are sent as part of a sequence of triggers.

13. A non-transitory machine-readable storage medium having embodied thereon instructions executable by one or more machines to perform operations on a controller comprising:

monitoring input lines from one or more sensors by periodically checking whether each input line has a signal, wherein each check is separated from a subsequent check by a period during which input lines are not checked, with a period having an interval that is less than a specified expected pulse width;

measuring a pulse width of any pulses detected on the input lines;

filtering out any pulses with a pulse width that is less than a threshold amount less than the specified expected pulse width; and sending any pulses not filtered out to a capture control component, wherein the capture control component is configured to trigger a camera to capture an image, based on the pulses not filtered out.

14. The non-transitory machine-readable storage medium of claim 13, wherein the controller further comprises a memory storing the specified expected pulse width.

15. The non-transitory machine-readable storage medium of claim 13, wherein the threshold amount is expressed as a percentage of the specified expected pulse width.

16. The non-transitory machine-readable storage medium of claim 13, wherein the controller is further configured to send one or more triggers to a lighting apparatus to control a plurality of independently controllable light sources.

17. The non-transitory machine-readable storage medium of claim 13, wherein the one or more triggers sent to a lighting apparatus are sent as part of a sequence of triggers.

* * * * *